United States Patent [19]

Edwards

[11] Patent Number: 4,633,979

[45] Date of Patent: Jan. 6, 1987

[54] SIMPLIFIED DISC BRAKE

[75] Inventor: Douglas F. Edwards, Mt. Vernon, Ohio

[73] Assignee: The J. B. Foote Foundry Co., Fredericktown, Ohio

[21] Appl. No.: 721,043

[22] Filed: Apr. 8, 1985

[51] Int. Cl.[4] ........................................... F16F 55/224
[52] U.S. Cl. .................................. 188/72.7; 188/71.1; 188/73.31; 192/70.23
[58] Field of Search ..................... 188/72.7, 72.6, 72.9, 188/73.31, 71.5; 192/70.23, 93 R, 93 A; 74/107

[56] References Cited

U.S. PATENT DOCUMENTS

| | | | |
|---|---|---|---|
| 2,815,104 | 12/1957 | Du Shane | 188/72.7 X |
| 3,035,664 | 5/1962 | Desvignes et al. | 188/72.9 |
| 3,463,274 | 8/1969 | Hollnagel et al. | 188/72.7 |
| 3,703,944 | 11/1972 | Hendrickson | 188/72.6 X |
| 4,008,114 | 2/1977 | Lindsey | 188/72.7 X |
| 4,102,440 | 7/1978 | Wood | 188/72.7 |
| 4,113,069 | 9/1978 | Craft et al. | 188/72.7 |

Primary Examiner—George E. A. Halvosa
Attorney, Agent, or Firm—Allen D. Gutchess, Jr.

[57] ABSTRACT

A simplified disc brake is provided, particularly for small gearboxes in the nature of transmissions and transaxles. The gearbox includes a housing having an output shaft extending therefrom with a brake disc mounted on the shaft for rotatable and limited longitudinal movement. The housing has a structurally integral brake puck pocket holding a first brake puck facing toward an inside surface of the brake disc. The housing also has a structurally integral second brake puck pocket holding a second brake puck opposite the first and facing toward an outside surface of the brake disc. The housing forms two spaced passages communicating with portions of the second brake puck pocket and holding pins positioned to move longitudinally toward the second brake puck to move it toward the brake disc. A mounting bolt is also supported by the housing between the two brake pin passages and a brake lever is pivotally mounted on the bolt and engageable with outer ends of the pins to move them toward the second brake puck when the lever is pivoted to set the brake. The housing also has a structurally-integral protective wall outside the brake disc.

4 Claims, 4 Drawing Figures

SIMPLIFIED DISC BRAKE

This invention relates to a simplified disc brake mechanism, particularly for use with smaller gearboxes in the nature of transmissions and transaxles.

Disc brakes for gearboxes as used on small vehicles such as riding lawn mowers, snowmobiles, snow throwers, golf carts, garden tillers, and the like have heretofore been known. However, such brakes have been comparatively expensive, employing brake puck holders of relatively complicated shapes, and a number of additional components. Such brakes are shown in U.S. Pat. Nos. 3,485,329, and 4,113,069, for example.

The present invention provides a simplified disc brake for a gearbox having a housing with an output shaft extending therefrom. A brake disc is mounted on the output shaft for rotatable movement therewith and for limited longitudinal movement. The housing has a first structurally-integral brake puck pocket holding a first brake puck facing toward an inside surface of the brake disc. The housing also has a second structurally-integral pocket holding a second brake puck facing an outside surface of the brake disc, in a position aligned with the first brake puck. The two pockets are formed by recesses in upper and lower parts of the housing which communicate with one another to form the complete pockets. The housing parts also have enlarged recesses and notches to receive and position the head and shank of a mounting bolt extending from the housing. Each of the housing parts also has a passage communicating with the second brake puck pocket with the passages holding brake pins which can be longitudinally moved toward and away from the second puck in the second pocket. A brake lever is pivotally mounted on the bolt and engages outer ends of the pins to move them toward the second brake puck to apply the brakes when the lever is pivoted on the bolt.

The housing can also have a structurally integral protective wall outside the brake disc to protect it and also to protect the operator and others from possible injury from the rotating disc.

The simplified disc brake does not require any separate brake puck holders of complicated shapes and also utilizes fewer, relatively simple components in the nature of the brake pins to actuate the brake pucks.

It is, therefore, a principal object of the invention to provide an improved simplified brake for a small gearbox.

Another object of the invention is to provide a simplified brake for a small transmission or transaxle which is lower in cost.

Yet another object of the invention is to provide a simplified disc brake for a gearbox having a housing forming a protective wall outside the brake disc.

Many other objects and advantages of the invention will be apparent from the following detailed description of a preferred embodiment thereof, reference being made to the accompanying drawings, in which.

Figure 1:
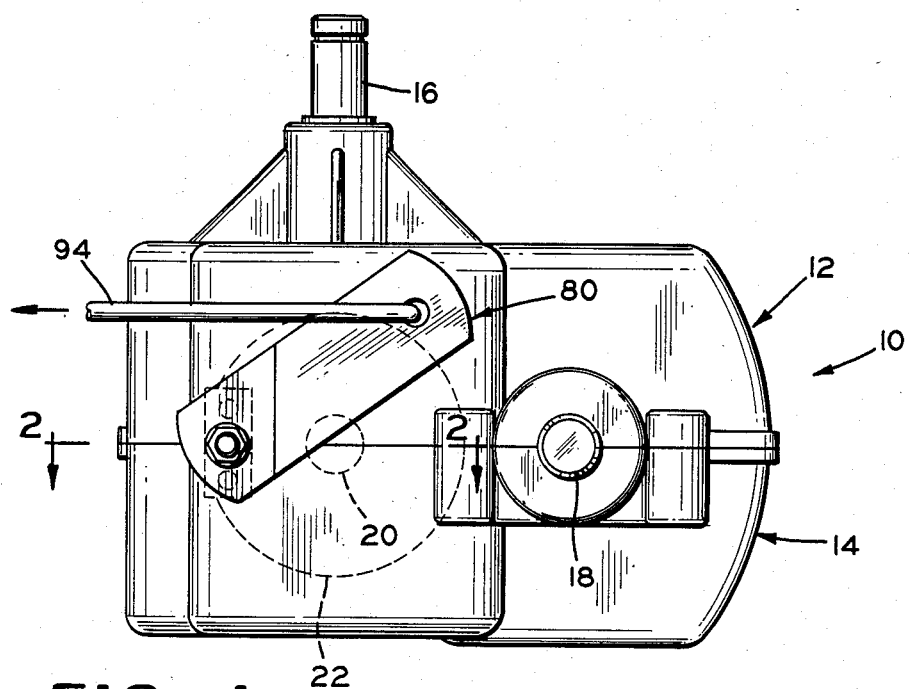
FIG. 1 is a somewhat schematic side view in elevation of a gearbox, specifically a small transmission, embodying a simplified brake in accordance with the invention.
Figure 2:
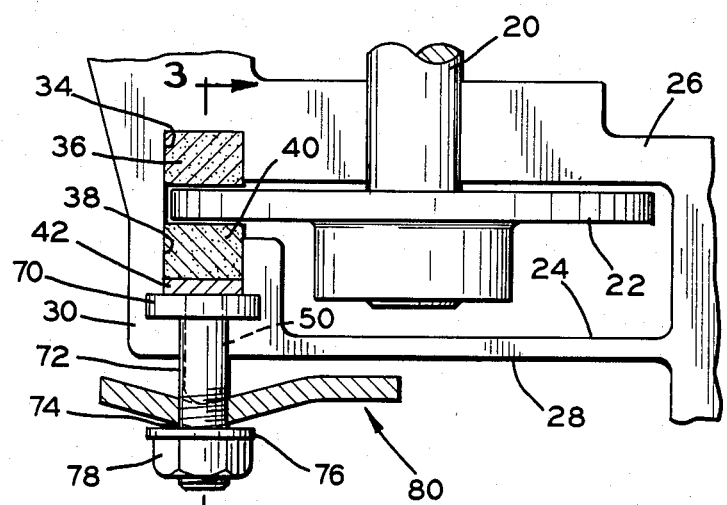
FIG. 2 is an enlarged view in horizontal section, taken along the line 2—2 of FIG. 1.

Referring to the drawings, and more particularly to FIG. 1, a gearbox embodying the invention is shown in the form of a transmission housing 10 which includes an upper housing part 12 and a lower housing part 14. An input shaft 16 extends upwardly from the upper housing part 12 and an intermediate shaft 18 and an output shaft 20 are located at the mating line of the housing parts. A brake disc 22 is keyed or otherwise affixed to an outer end of the output shaft 20 for rotatable movement therewith and for short, longitudinal movement with respect thereto. The brake disc 22 is located in a vertical, open-ended chamber 24 which is formed by a main wall 26 of the housing and a thinner, protective outer wall 28 which is connected at one end to the main wall by a thickened end wall 30. The end wall 30 has a vertical slot 32 into which an edge portion of the brake disc 22 extends.

Figure 4:
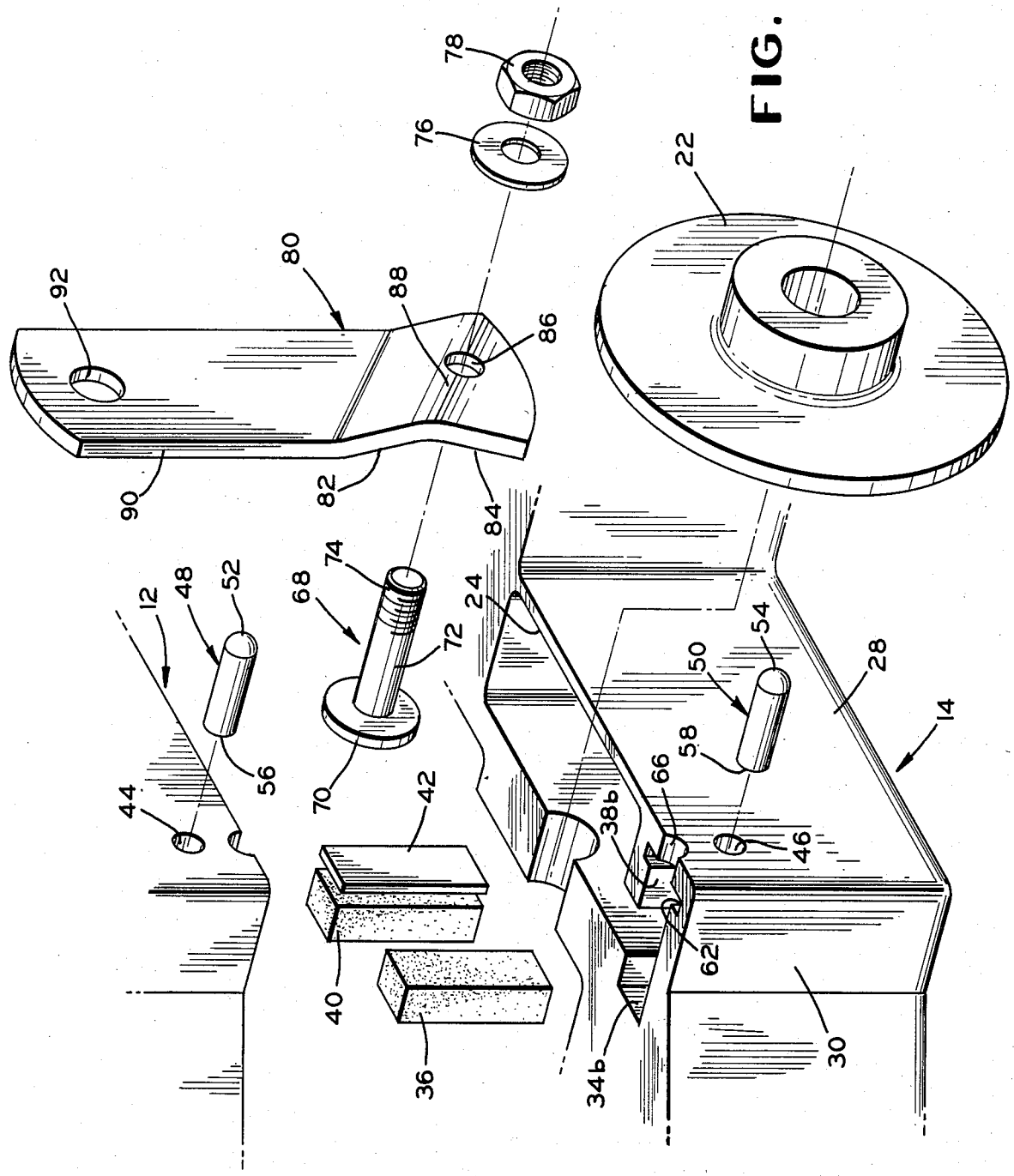
FIG. 4 is a fragmentary, exploded view in perspective of the gearbox housing and brake of FIGS. 1-3.

A puck pocket or retainer 34 formed in the main wall 26 holds a first brake puck 36 which extends slightly into the slot 32 adjacent an inner face of the brake disc 22. As shown in FIG. 4, in particular, the brake puck 36 is in the form of a rectangular parallelepiped. The puck pocket 34 is formed by an upper recess 34a formed in the upper housing part 12 with a lower open end aligned with an upper open end of a lower recess 34b formed in the lower housing part 14.

A puck pocket or retainer 38 is also formed in the end wall 30 and holds a second brake puck 40 which is similar to the puck 36 but also has a backing plate 42. The puck pocket 38 is formed by an upper recess 38a formed in the upper housing part 12 with a lower open end aligned with an upper open end of a lower recess 38b formed in the lower housing part 14.

Figure 3:
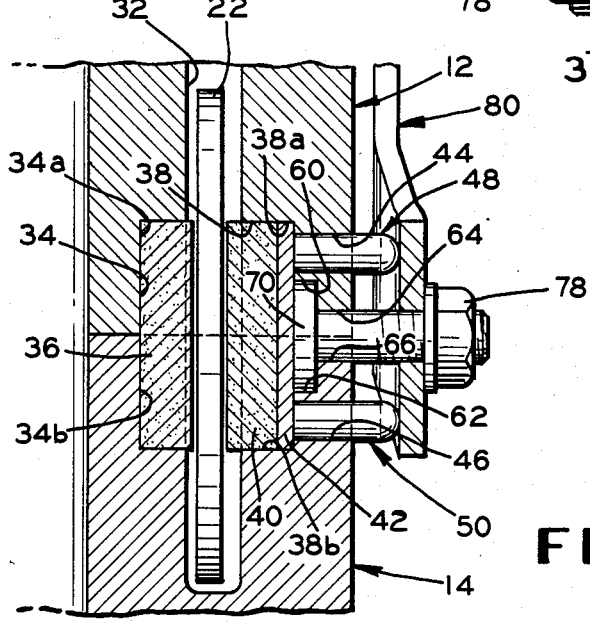
FIG. 3 is a fragmentary view in vertical section taken along the line 3—3 of FIG. 2.

The upper housing part 12 also has a hole or passage 44 (FIGS. 3 and 4) communicating with the upper recess 38a and the lower housing part 14 has a hole or passage 46 communicating with the lower recess 38b. Brake pins 48 and 50 are located in the holes or passages 44 and 46 for slidable, longitudinal movement with respect thereto. The pins have rounded outer ends 52 and 54 and squared inner ends 56 and 58 which engage the backing plate 42.

The mating edges of the upper and lower housing parts 12 and 14 have enlarged, semi-circular recesses 60 and 62 therein along with upper and lower semi-circular notches 64 and 66. A mounting bolt 68 has a head 70 received in the semi-circular recesses 60 and 62 and a shank 72 received in the notches 64 and 66. The outer end of the shank 72 is threaded at 74 and receives a washer 76 and a nut 78 which hold a brake lever 80 on the shank 72 for pivotal movement thereon.

The lower end of the brake lever 80 has an upper angular portion or surface 82 which is positioned to engage the rounded end 52 of the brake pin 48 and a lower angular portion or surface 84 which is positioned to engage the outer rounded end 54 of the lower brake pin 50 when the brake lever 80 is mounted on the mounting bolt 68 with an opening 86 of the lever received on the shank 72 of the bolt. The angular portions 82 and 84 meet at an apex 88 extending through the mounting hole 86 and angularly located with respect to the longitudinal extent of the lever 80. The lever 80 also includes an outwardly extending arm 90 having a connecting hole 92 near an outer end thereof. The hole can receive a linkage 94 (FIG. 1) which can be connected to suitable mechanism near the operator's seat, in the case of a small, riding vehicle, to move the lever 80 and set the brake. When the lever is moved counterclockwise, from the position shown in FIG. 1, the inner surfaces of the angular portions 82 and 84 force the pins 48 and 50 inwardly to move the backing plate 42 and the outer brake puck 40 inwardly. The puck 40 thereby engages the outer surface of the disc 22 and forces it slightly longitudinally on the shaft 20 to engage the inner puck 36 and to set the brake.

From the above, it will be seen that the brake in accordance with the invention is of relatively simple construction and low in cost. The puck pockets 34 and 38, being structurally integral with the housing parts 12 and 14, eliminate the complicated puck holders heretofore required. The pin openings 44 and 46 along with the recesses 60, 62 and the notches 64, 66 for the mounting bolt 68 also eliminate additional components. Besides the usual brake pucks 36 and 40, along with the backing plate 42, the only additional components required are the relatively simple brake pins 48 and 50, the mounting bolt 68, along with the nut and washer, and the brake lever 80. The structurally integral wall 28 of the housing also provides protection for both the brake disc 22 and the operator or other people.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In combination, a housing having an upper part and a lower part non-integrally meeting along a mating line, an output shaft extending from the housing at the mating line, a brake disc rotatable with said output shaft, a first brake puck, said upper housing part having a first upper recess with an open lower end, said lower housing part having a first lower recess with an open upper end communicating with the lower open end of said upper recess to form a first puck pocket, a second brake puck, said upper housing part having a second upper recess with a lower open end, said lower housing part having a second lower recess with an upper open end communicating with the lower open end of said second upper recess to form a second puck pocket, said first puck pocket positioning said first brake puck in a position facing toward an inside surface of said brake disc which faces toward said housing, said second puck pocket positioning said second brake puck in a position facing toward an outside surface of said brake disc which faces away from said housing, with said first and second brake pucks being in alignment on opposite sides of said brake disc, said upper housing part having a pin passage communicating with said second upper recess, said lower housing part having a pin passage communicating with said second lower recess, pins in said passages, longitudinally movable therein, and positioned to move said second brake puck against the outer surface of said brake disc when said pins are moved toward said second brake puck, a mounting bolt having a shank and an enlarged head, said upper and lower housing parts having enlarged recesses communicating with one another at the mating line of said parts to receive and hold said head of said bolt, and said upper and lower housing parts having notches communicating with one another at the mating line to receive and hold said shank of said bolt, and a brake lever mounted on said mounting bolt and engagable with outer ends of said pins to move said pins when said lever is moved on said mounting bolt.

2. The combination according to claim 1 characterized by said housing having a structurally-integral protective wall extending across said brake disc outside the outer surface of said brake disc.

3. In combination, a housing having an upper part and a lower part non-integrally meeting along a mating line, an output shaft extending from the housing at the mating line, a brake disc rotatable with said output shaft, a first brake puck, said upper housing part having a first upper recess with an open lower end, said lower housing part having a first lower recess with an open upper end communicating with the lower open end of said upper recess to form a first puck pocket, a second brake puck, said upper housing part having a second upper recess with a lower open end, said lower housing part having a second lower recess with an upper open end communicating with the lower open end of said second upper recess to form a second puck pocket, said first puck pocket positioning said first brake puck in a position facing toward an inside surface of said brake disc which faces toward said housing, said second puck pocket positioning said second brake puck in a position facing toward an outside surface of said brake disc which faces away from said housing, with said first and second brake pucks being in alignment on opposite sides of said brake disc, said upper housing part having a pin passage communicating with said second upper recess, said lower housing part having a pin passage communicating with said second lower recess, pins in said passages, longitudinally movable therein, and positioned to move said second brake puck against the outer surface of said brake disc when said pins are moved toward said second brake puck, a mounting bolt having a shank, said upper and lower housing parts having notches communicating with one another at the mating line to receive and hold said shank of said bolt, said upper and lower housing parts having a structurally-integral, protective wall forming a vertical, open-ended chamber with a main wall of said housing, said protective wall extending across the entire brake disc outside the outer surface of said brake disc, and a brake lever mounted on said mounting bolt and engagable with outer ends of said pins to move said pins when said lever is moved on said mounting bolt.

4. The combination according to claim 3 characterized by said upper housing part having a first enlarged recess with a lower open end, said lower housing part having a second enlarged recess with an upper open end communicating with the lower open end of said first enlarged recess, said mounting bolt having an enlarged head received in said first and second enlarged recesses, said enlarged recesses communicating with said notches of said upper and lower housing parts.

* * * * *